(12) United States Patent
Shirokoshi

(10) Patent No.: US 8,864,617 B2
(45) Date of Patent: Oct. 21, 2014

(54) PLANETARY DIFFERENTIAL REDUCTION DEVICE

(75) Inventor: Norio Shirokoshi, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 13/816,992

(22) PCT Filed: Jun. 29, 2012

(86) PCT No.: PCT/JP2012/004234
§ 371 (c)(1),
(2), (4) Date: Feb. 14, 2013

(87) PCT Pub. No.: WO2014/002144
PCT Pub. Date: Jan. 3, 2014

(65) Prior Publication Data
US 2014/0004989 A1    Jan. 2, 2014

(51) Int. Cl.
*F16H 48/10*    (2012.01)

(52) U.S. Cl.
CPC ............................... *F16H 48/10* (2013.01)
USPC ........................................ 475/248; 475/150

(58) Field of Classification Search
USPC ................................................ 475/248
See application file for complete search history.

(56) References Cited

U.S. PATENT DOCUMENTS 7,588,511 B2 *   9/2009   Tangl et al. ................. 475/150

FOREIGN PATENT DOCUMENTS

| JP | S60-095250 U | 6/1985 |
|---|---|---|
| JP | H09-211015 A | 8/1997 |
| JP | 2006-275274 A | 10/2006 |
| JP | 2010-216588 A | 9/2010 |
| JP | 2011-043224 A | 3/2011 |

OTHER PUBLICATIONS

International Search Report for PCT/JP2012/004234, Sep. 4, 2012.

* cited by examiner

*Primary Examiner* — Erin D Bishop

(57) ABSTRACT

When a first output shaft (5) of a planetary differential reduction device (1) is driven to rotate, a first internal gear (24) of a first planetary reduction part (20) and a second internal gear (34) of a second planetary reduction part (30) are rotated in the same direction at the same speed, and a planetary carrier (63) of a third planetary reduction part (40) is also rotated in the same direction at the same speed, whereby a second output shaft (6) connected to the planetary carrier (63) is rotated synchronously with the first output shaft (5). When differential rotation is inputted to the second sun gear (31), a reduced rotational output is output to the planetary carrier (63) of the third planetary reduction part (40). The second output shaft (6) is added with the reduced rotational output for differential rotation, whereby the second output shaft (6) is shifted to a differential rotating state. It is possible to realize a small, compact and highly reliable differential mechanism compared to a case in which spur gears and bevel gears are used.

2 Claims, 3 Drawing Sheets

PLANETARY DIFFERENTIAL REDUCTION DEVICE

TECHNICAL FIELD

The present invention relates to a planetary differential reduction device for shifting the state of two rotational members rotating at the same speed into differentially rotating state thereof as required.

BACKGROUND ART

There are cases in which two rotational members, such as concentrically arranged outer and inner rolls, are shifted in their rotational state as needed, from a synchronously rotating state in which they rotate synchronously with each other into a differentially rotating state in which they rotate differentially with a certain speed difference. There are also cases in which a rotational plate and a phase gear for rotating a table are rotated in the same direction and, when required, only one of the rotational plate and phase gear is rotated in order to provide a phase difference between them. Such operations are performed by a phase-angle providing rotational device disclosed in Patent Document 1, for example.

PRIOR ART DOCUMENT

Patent Document

Patent Document 1: JP 2010-216588 A

SUMMARY OF INVENTION

Problems to be Solved by the Invention

In the past, differential mechanisms constituted by assembling spur gears are commonly used to change a synchronously rotating state into a differentially rotating state. The differential mechanisms constituted by spur gears are complicated in structure and lack of reliability. In the phase-angle providing rotational device disclosed in Patent Document 1, an input from a phase rotational source is used to provide a phase angle and a differential mechanism is constituted by assembling spur gears and bevel gears.

An object of the present invention is to provide a planetary differential reduction device which is small, compact and highly reliable compared to differential mechanisms employing spur gears and bevel gears.

Means to Solve the Problems

In order to achieve the above object, a planetary differential reduction device for synchronously rotating and differentially rotating a first output shaft and a second output shaft according to the present invention, characterized in comprising:

a first sun gear at a fixed side;
a second sun gear having the same number of teeth as the first sun gear and disposed adjacent to the first sun gear in a direction of a device axis;
a first planetary gear meshed with the first sun gear;
a second planetary gear having the same number of teeth as the first planetary gear and meshed with the second sun gear;
a common planetary carrier for supporting the first planetary gear and the second planetary gear;
a first internal gear meshed with the first planetary gear; and,
a second internal gear meshed with the second planetary gear and having the same number of teeth as the first internal gear, wherein
the first internal gear is connected to a side of the first output shaft, the second internal gear is connected to a side of the second output shaft, and the second sun gear is an input element inputting a rotation for differentially rotating the second output shaft with respect to the first output shaft.

In the planetary differential reduction device as constituted above, the first internal gear connected to the first output shaft is rotated when the first output shaft is driven to rotate. At the same time, the second internal gear is rotated in the same direction and at the same speed as the first internal gear, whereby the second output shaft connected to the second internal gear is rotated in the same direction and at the same speed. Thus, the second output shaft can be rotated synchronously with the first output shaft.

When shifted to a differential rotational state, an input for differential rotation is inputted into the second sun gear. When the second sun gear rotates, the input rotation is reduced at a prescribed reduction ratio and is outputted from the second internal gear. Thus, the second internal gear is shifted to a differential rotating state with respect to the first internal gear, since the rotation of the first internal gear is added with the reduced output rotation. The second output shaft connected to the second internal gear is therefore shifted to a prescribed differentially rotating state.

In order to reduce the input for differential rotation at a higher reduction ratio, a planetary reduction part may be inserted between the second internal gear and the second output shaft. In this case, an internal gear of the planetary reduction part may be connected to the first internal gear and is rotated integrally therewith and the reduced output may be output from a planetary carrier of the planetary reduction part and delivered to the second output shaft. With this, the sun gear, planetary carrier and internal gear of the planetary reduction part rotate integrally at the same speed, so that the second output shaft can be made a state rotating synchronously with the first output shaft when there is no input for differential rotation, while the second output shaft can be shifted to the differentially rotating state when an input for differential rotation is provided.

Effect of the Invention

The planetary differential reduction device of the present invention employs the structure in which planetary reduction mechanisms are assembled, whereby realizing a differential mechanism for shifting the first and second output shaft between the synchronously rotating state and differentially rotating state. Therefore, it is possible to realize a compact differential mechanism with high reliability in comparison with those constituted by assembling spur gears or those constituted by assembling spur and bevel gears.

MODE FOR CARRYING OUT THE INVENTION

Figure 1A:
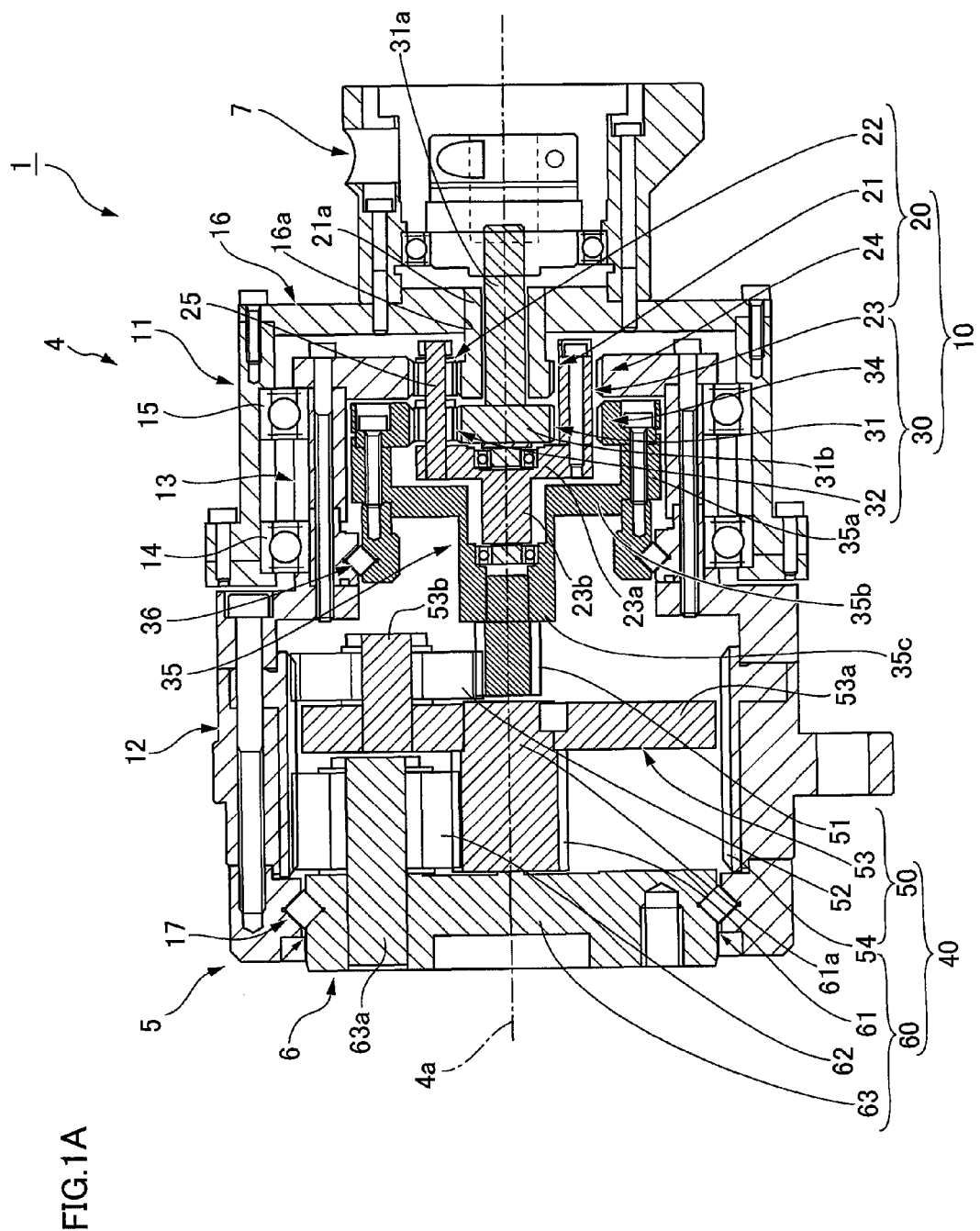
FIG. 1A is a longitudinal sectional view of a planetary differential reduction mechanism of a planetary differential reduction device according to the present invention.
Figure 1B:
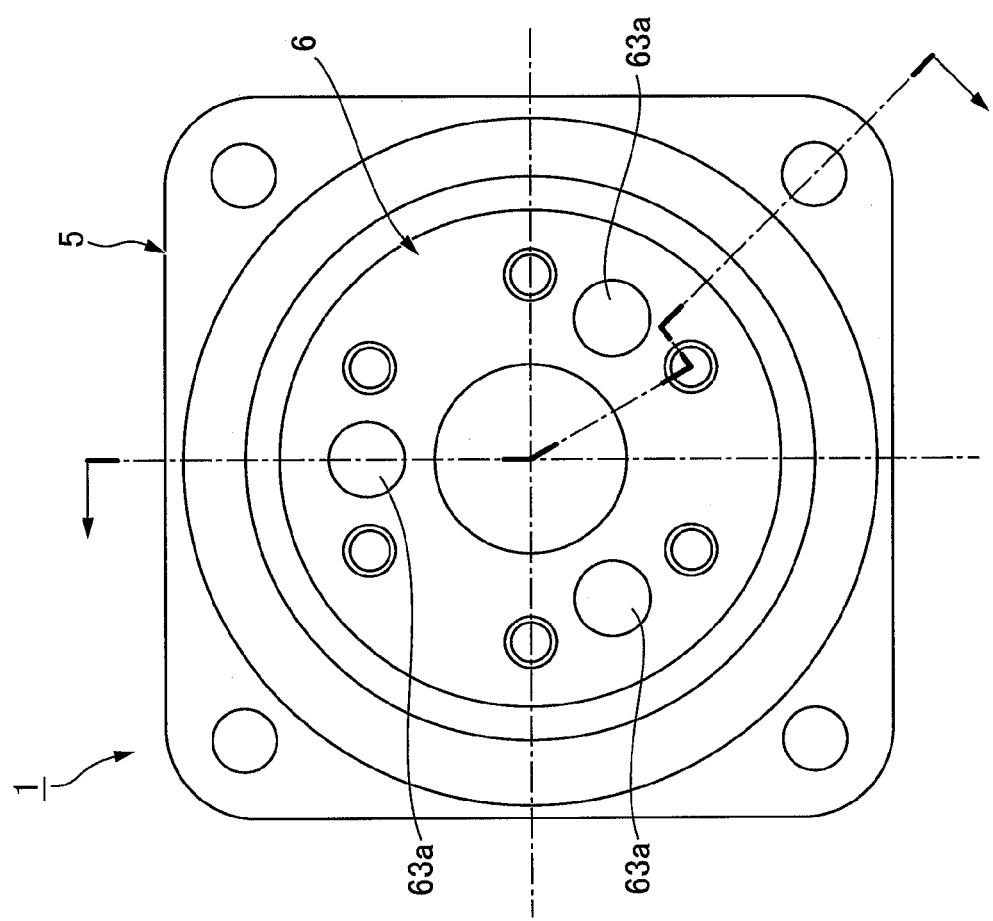
FIG. 1B is a front view of the planetary differential reduction device of FIG. 1A.
Figure 2:
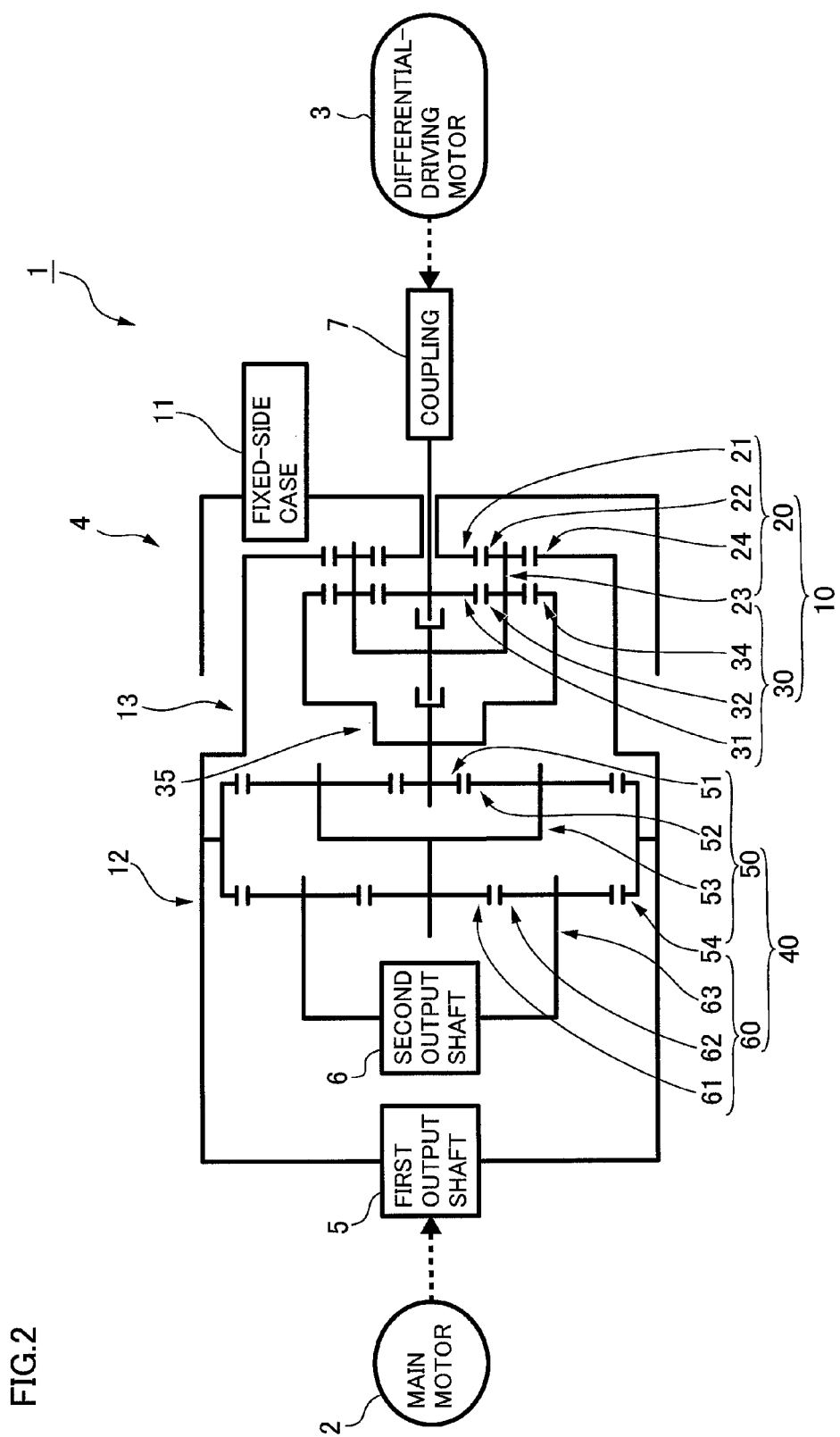
FIG. 2 is a skeleton diagram of the planetary differential reduction device of FIG. 1A.

With referent to FIGS. 1A, 1B and 2, there will be described an embodiment of a planetary differential reduction device according to the present invention. The shown planetary differential reduction device is for synchronously rotating and differentially rotating a double-roll assembly constituted by an outer roll and inner roll, for example.

(Explanation of Structure)

The planetary differential reduction device 1 has a main motor 2 for driving rolls, a differential-driving motor 3, and a planetary differential reduction mechanism 4. The planetary differential reduction mechanism 4 is able to drive a first output shaft 5 connected to a not-shown outer roll and a second output shaft 6 connected to a not-shown inner roll in a manner changeable between a synchronously rotating state by the main motor 2 and a differentially rotating state by the main motor 2 and the differential-driving motor 3.

The planetary differential reduction mechanism 4 has a cylindrical fixed-side case 11 and a cylindrical rotational-side case 12 extending form the front end of the fixed-side case 11 coaxially. The rotational-side case 12 is fixed with an inner-side case 13 extending from the rear end of the rotational-side case 12 into inside the fixed-side case 11 coaxially. Ball bearings 14 and 15 are arranged at a certain interval along a device axis 4a between the fixed-side case 11 and inner-side case 13. The rotational-side case 12 is supported rotatably by the fixed-side case 11 via the ball bearings 14 and 15. The fixed-side case 11 has a rear end opening which is shield off by a disc-shaped end plate 16 fixedly connected thereto. The rotational-side case 12 has a front end, to which the disc-shaped first output shaft 5 is fixed coaxially. The second output shaft 6 of a disc shape is rotatably accommodated inside the first output shaft 5 via a cross roller bearing 17. The second output shaft 6 shields off the front end opening of the rotational-side case 12.

Inside the fixed-side case 11, are accommodated a first planetary reduction part 20 and a second planetary reduction part 30 constituting a special planetary differential reduction part 10 of the planetary differential reduction mechanism 4. Inside the rotational-side case 12, is accommodated a third planetary reduction part 40 for further reducing the reduced rotational output for differential rotation exerted from the special planetary differential reduction part 10. A coupling 7 is connected coaxially to the end plate 16 at the rear surface side thereof, the end plate shielding off the rear end of the fixed-side case 11. An output rotation of the differential-driving motor 3 is inputted to the special planetary differential reduction part 10 via the coupling 7.

The first planetary reduction part 20 of the special planetary differential reduction part 10 has a fixed-side first sun gear 21 arranged so that the center axis thereof is on the device axis 4a, one or more first planetary gears 22 meshed with the first sun gear 21, a first planetary carrier 23 supporting the first planetary gears 22 rotatably, and a first internal gear 24 meshed with the first planetary gears 22. The first sun gear 21 is formed with a hollow shaft part 21a, the rear end part of which is coaxially fixed to the inner circumferential portion of a center through-hole 16a formed in the end plate 16. The first planetary carrier 23 is a common planetary carrier which functions as the planetary carrier of the second planetary reduction part 30 as described hereinafter, and rotates about the device axis 4a. The first internal gear 24 is fixed coaxially to the rear end of the inner-side case 13. The first internal gear 24 rotates integrally with the inner-side case 13, rotational-side case 12 and first output shaft 5.

The second planetary reduction part 30 of the special planetary differential reduction part 10 has a second sun gear 31 for inputting a differential rotation, one or more second planetary gears 32 meshed with the second sun gear 31, and a second internal gear 34 meshed with the second planetary gears 32, wherein the second sun gear 31 is connected to the output shaft (not shown) of the differential-driving motor 3 via the coupling 7, a reduced output rotation is exerted from the second internal gear 34. The second planetary gears 32 are supported by the first planetary carrier 23 in a manner that they are free to rotate about the planetary shaft 25, the planetary shaft 25 being a common shaft for the first planetary gears 22.

The second sun gear 31 has the same number of teeth as the first sun gear 21, and is formed with a solid shaft part 31a and a tooth part 31b. The tooth part 31b is formed on the front end of the shaft part 31a and has a diameter slightly larger than the shaft part 31a, and external teeth are formed on the outer circumferential surface of the tooth part 31b. The shaft part 31a passes through the hollow part of the hollow shaft part 21a of the first sun gear 21, projects outward from the end plate 16 and fixed to the coupling 7. The first planetary carrier 23 supporting the second planetary gears 32 has a disc-shaped end plate part 23a positioned in front of the second sun gear 31 and a small-diameter shaft part 23b projecting coaxially toward front side from the front-side end surface of the end palate part 23a. The planetary shafts 25 are fixed to the outer peripheral side portion of the rear-side end surface of the end plate part 23a in a manner that they project rearward in parallel with the device axis 4a.

The first planetary gears 22 are mounted on the end-side portions of the planetary shafts 25, that is, on the rear end-side positions of the planetary differential reduction mechanism 4, and the second planetary gears 32 are mounted on the portions at the front side of the first planetary gears. The first and second planetary gears 22, 32 are of the same number of teeth, and the first and second internal gears 24, 34 are of the same number of teeth.

The second internal gear 34 is fixed coaxially to the rear end of a cup-shaped output member 35 which is arranged coaxially inside the inner-side case 13. The output member 35 is formed to have a large-diameter annular part 35a, a disc-shaped end plate part 35b extending toward the center thereof from the front end part of the annular part, a small-diameter annular part 35c projecting frontward coaxially from the center portion of the end plate part 35b. The output member 35 is supported inside the inner-side case (hollow shaft part) 13 via a cross roller bearing 36 so as to rotate freely. The shaft part 23b of the planetary carrier 23 is inserted coaxially into the small-diameter annular part 35c from the rear side thereof, and the front end part of the shaft part 23b is supported by the small-diameter annular part 35c via a ball bearing in a freely rotatable manner.

Next, the third planetary reduction part 40 accommodated inside the rotational-side case 12 is a two-state planetary reduction mechanism consisting of a front-stage planetary reduction part 50 and a rear-stage planetary reduction part 60 in this embodiment, and has an internal gear 54 which is common to the front and rear stages. The internal gear is fixed on the inner part of the rotational-side case 12 so as to integrally rotate with the rotational-side case 12.

The front-stage planetary reduction part 50 has a front-stage sun gear 51, front-stage planetary gears 52 meshed with the sun gear 51 and an internal gear 54 meshed with the front-stage planetary gear 52. The front-stage sun gear 51 is fixed from front side by press fitting to the small-diameter annular part 35c of the output member 35 of the second planetary reduction part 30. The front-stage planetary carrier 53 has a disc-shaped end plate part 53a and planetary shafts 53b extending rearward from the rear-side end surface of the end plate part 53a.

The rear-stage planetary reduction part 60 has a rear-stage sun gear 61, rear-stage planetary gears 62 meshed with the sun gear 61, a rear-stage planetary carrier 63 for supporting the rear-stage planetary gears 62 in a freely rotatable state, the internal gear 54 which is common with the front stage and meshed with the rear-stage planetary gears 62. The rear-stage planetary carrier 61 has a rear-end side shaft part 61a which is fixed by press fitting to a center through-hole formed in the end plate part 53a of the front-stage planetary carrier 53. The rear-stage planetary carrier 63 has a structure in which planetary shafts 63a are mounted on the disc-shaped second output shaft 6. In this embodiment, three planetary shafts 63a are arranged at the same angular intervals, and the rear-stage planetary gears 62 are mounted on the respective shafts 63a.

(Explanation Of Operation)

In the present embodiment, a not-shown outer roll is connected to the first output shaft 5, and the second output shaft 6 is connected to a not-shown inner roll in order to rotate the outer and inner rolls differentially. The first output shaft 5 is driven to rotate by the main motor 2, and the second sun gear 31 for inputting a differential rotation is driven to rotate by the differential-driving motor 3.

First, a case of synchronously rotating state of the outer and inner rolls will be explained, in which the first and second output shafts 5, 6 rotate in the same direction at the same speed. In this case, only the main motor 2 is driven. When the first output shaft 5 is driven to rotate by the main motor 2, the rotational-side case 12, inner-side case 13 and the first internal gear 24 of the first planetary reduction part 20, which are connected to the first output shaft 5, are integrally rotated in the same direction at the same speed.

Since the first sun gear 21 of the first planetary reduction part 20 is fixed to the fixed-side case 11 so as not to rotate, the first planetary carrier 23 is rotated at a prescribed speed via the first planetary gears 22. In the first planetary carrier 23, the second planetary gears 32 of the second planetary reduction part 30 are supported on the common planetary shafts 25, and therefore the second internal gear 34 meshed with the second planetary gears 32 is also rotated in the same direction at the same speed.

Accordingly, in the third planetary reduction part 40, the internal gear 54 (third internal gear) fixed to the first output shaft 5 and the input-side front-stage sun gear 51(third sun gear) fixed to the rotational-side case are rotated in the same direction at the same speed. The output-side rear-stage planetary carrier 63 (third planetary carrier) is also rotated in the same direction at the same speed, and the second output shaft 6 fixed to the planetary carrier 63 is rotated in the same direction at the same speed. In other words, the first output shaft 5 and the second output shaft 6 are rotated synchronously.

Whereas, in the above synchronously rotating state, when the differential-driving motor 3 is driven to rotate at a prescribed speed, the second sun gear 31 of the second planetary reduction part 30 connected to the differential-driving motor 3 is rotated. The rotation of the second sun gear 31 is reduced at a prescribed reduction ratio by the second planetary reduction part 30, and then is outputted to the second output shaft 6 via the output-side rear-stage planetary carrier 63 (third planetary carrier).

Therefore, the input rotation from the differential-driving motor 3 is reduced through the second and third planetary reduction parts 30 and 40, and transmitted to the second output shaft 6, whereby the second output shaft 6 rotates differentially to the first output shaft 5 at a speed faster or slower than the first output shaft by the transmitted differential rotation speed. Thus, when the differential-driving motor 3 is driven to rotate, the synchronously rotating state is shifted to the differentially rotating state. The rotational state of the first and second output shafts 5 and 6 is returned to the synchronously rotating state again by stopping the differential-driving motor 3.

In the present embodiment, although the third planetary reduction part 40 is constituted by the two-stage planetary reduction mechanism, it is possible to employ a single-stage planetary reduction mechanism. Further, in a case in which the input for differential rotation is not needed to reduce at a high rate or in other cases, the planetary differential reduction mechanism 4 may be constituted by only the special planetary differential reduction mechanism 10 without providing the third planetary reduction mechanism 40. Furthermore, although the planetary differential reduction device 1 of the present embodiment is used to change the rotating state of the outer and inner rolls constituting the double-roll assembly between the synchronously rotating state and the differentially rotating stage, it is needless to say that the device of the present invention may be used for changing the rotating state of the other two rotating members between the synchronously rotating state and the differentially rotating state.

The invention claimed is:

1. A planetary differential reduction device for synchronously rotating and differentially rotating a first output shaft and a second output shaft, comprising:
   a first sun gear being fixed not to rotate;
   a second sun gear having a same number of teeth as the first sun gear and disposed adjacent to the first sun gear in a direction of a device axis;
   a first planetary gear meshed with the first sun gear;
   a second planetary gear having a same number of teeth as the first planetary gear and meshed with the second sun gear;
   a common planetary carrier for supporting the first planetary gear and the second planetary gear;
   a first internal gear meshed with the first planetary gear; and
   a second internal gear meshed with the second planetary gear and having a same number of teeth as the first internal gear, wherein
   the first internal gear is connected to a side of the first output shaft, the second internal gear is connected to a side of the second output shaft, and the second sun gear is an input element for inputting a rotation for differentially rotating the second output shaft with respect to the first output shaft,
   the planetary differential reduction device further comprising:
   a planetary reduction part connecting the second internal gear and the second output shaft, wherein
   the planetary reduction part comprises:
   a third sun gear integrally rotating with a second internal gear;
   a third planetary gear meshed with the third sun gear;
   a third internal gear meshed with the third planetary gear and rotating integrally with the first internal gear; and
   a planetary carrier for supporting the third planetary gear, and wherein
   the planetary carrier for supporting third planetary gear is connected to the second output shaft.

2. The planetary differential reduction device according to claim 1 comprising:
   a cylindrical fixed-side case and a cylindrical rotational-side case, wherein
   the rotational-side case is arranged adjacent to the fixed-side case in a coaxial manner, an inner-side case extending coaxially inside the fixed-side case is fixed to an end of the rotational-side case, the inner-side case is supported by the fixed-side case so as to be rotatable about the device axis, an end plate is fixed to an end of the fixed-side case opposite to the rotational-side case, the first output shaft is of a disc shape and is fixed coaxially to an end of the rotational-side case opposite to the fixed-side case, the second output shaft is of a disc shape and is arranged rotatably about the device axis inside the first output shaft, the first internal gear is fixed coaxially to an end of the inner-side case opposite to the rotational-side case, the first sun gear has a hollow shaft part fixed to the end plate in a manner passing through a center portion of the end plate, the second sun gear has a shaft part for inputting the rotation for differentially rotating the second output shaft with respect to the first output shaft, the shaft part passing through a hollow part of the hollow shaft part and projecting outward of the end plate, the second internal gear is arranged inside the inner-side case and is fixed to an output member supported rotatably by the inner-side case, the output member supports the common planetary carrier rotatably about the device axis on one sideof the output member along the device axis, and has a hollow shaft part on the other side of the output member along the device axis, wherein the third sun gear of the planetary reduction part is fixed coaxially to the hollow shaft part, the common planetary carrier supports the second sun gear so as to be rotatable about the device axis, and the third sun gear, the third planetary gear, the planetary carrier for supporting the third planetary gear and the third internal gear are disposed inside the rotational-side case, and the third internal gear is fixed to the rotational-side case.

\* \* \* \* \*